United States Patent [19]

DuFresne

[11] Patent Number: 4,666,561
[45] Date of Patent: May 19, 1987

[54] METHOD OF EVAPORATION

[75] Inventor: Eugene R. DuFresne, Sierra Madre, Calif.

[73] Assignee: The United States of America as represented by the Administrator of the National Aeronautics and Space Administration, Washington, D.C.

[21] Appl. No.: 761,310

[22] Filed: Jul. 30, 1985

Related U.S. Application Data

[63] Continuation of Ser. No. 511,363, Jul. 6, 1983, abandoned.

[51] Int. Cl.$^4$ .............................................. B01D 3/10
[52] U.S. Cl. ...................................... 203/90; 203/91; 203/98; 159/3; 159/48.2; 159/900; 159/DIG. 16; 159/DIG. 23; 426/492; 75/20 R
[58] Field of Search ............... 159/1.1, 3, 48.2, 43.1, 159/22, DIG. 16, DIG. 23, 900; 203/90, 91, 98; 202/91, 187, 205, 236; 239/556, 560, 599; 426/490–492; 75/20 R

[56] References Cited

U.S. PATENT DOCUMENTS

| Re. 23,958 | 3/1955 | Toulmin, Jr. | 62/124 |
|---|---|---|---|
| 795,650 | 7/1905 | Rogers | 159/22 |
| 2,232,544 | 2/1941 | Lorenz | 203/90 |
| 2,453,109 | 11/1948 | MacDowell et al. | 99/205 |
| 2,471,035 | 5/1949 | Hurd | 159/DIG. 23 |
| 2,798,542 | 7/1957 | Drewitt et al. | 159/48.2 |
| 2,910,516 | 10/1959 | Rush | 426/490 |
| 2,916,386 | 12/1959 | Toulmin, Jr. | 99/205 |
| 2,957,773 | 10/1960 | Toulmin, Jr. | 99/205 |
| 2,969,111 | 1/1961 | Bocognano | 159/1 A |
| 3,024,117 | 3/1962 | Barlow | 99/206 |
| 3,276,848 | 10/1966 | Barr, Sr. et al. | 23/294 |
| 3,419,251 | 12/1968 | Eckert | 239/556 |
| 3,880,702 | 4/1975 | Troshenkein | 159/43.1 |
| 3,892,662 | 7/1975 | Stout | 210/66 |
| 4,099,947 | 7/1978 | Ganiaris | 62/532 |
| 4,101,681 | 7/1978 | Hurlow et al. | 426/387 |
| 4,265,402 | 5/1981 | Tsai | 239/102 |

Primary Examiner—David L. Lacey
Attorney, Agent, or Firm—Paul F. McCaul; John R. Manning; Thomas H. Jones

[57] ABSTRACT

Liquids, such as juices, milk, molten metal and the like are concentrated by forming uniformly-sized, small droplets in a precision droplet forming assembly (14) and deploying the droplets in free fall downwardly as a central column within an evacuated tower (12) having cool walls (32). A portion of the solvent evaporates. The vapor flows to the wall (32), condenses, and usually flows down the wall as a film (62) to condensate collector (26) and drain (28). The vertical column of freely-falling droplets enters the splash guard (68). The condensate can be collected, sent to other towers or recycled.

20 Claims, 10 Drawing Figures

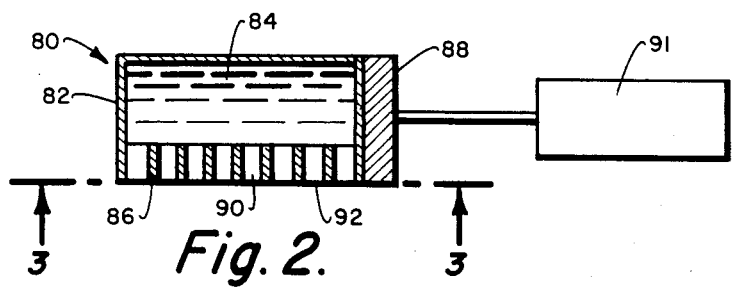
Fig. 2.
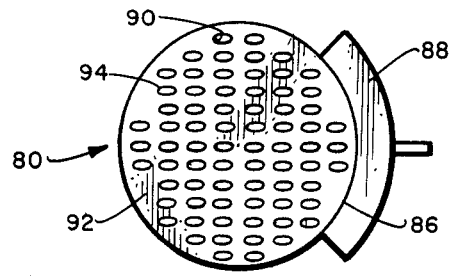
Fig. 3.
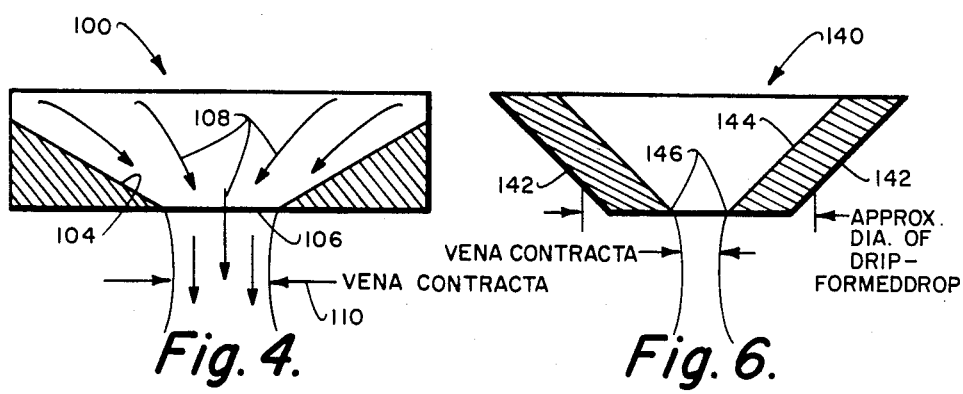
Fig. 4.     Fig. 6.
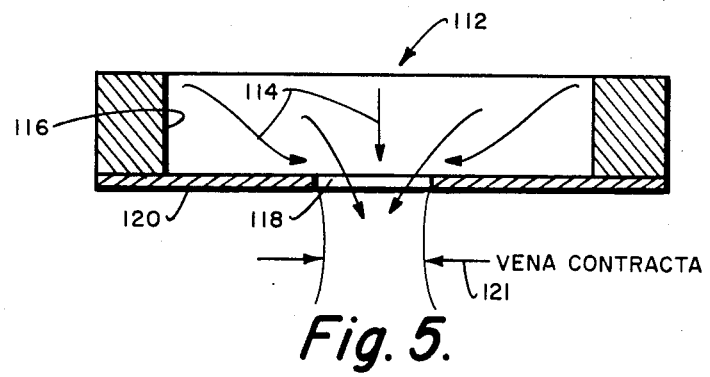
Fig. 5.

METHOD OF EVAPORATION

ORIGIN OF THE INVENTION

The invention described herein was made in the performance of work under a NASA contract and is subject to the provisions of Section 305 of the National Aeronautics and Space Act of 1958, Public Law 83-568 (72 Stat 435; 42 USC 2457).

This application is a continuation of application Ser. No. 511,363, filed July 6, 1983, now abandonded.

TECHNICAL FIELD

The present invention relates to the concentration of liquids and more particularly to the concentration of solutions or dispersions by the evaporation of small droplets falling into an evacuated tower with chilled walls.

BACKGROUND ART

Concentration of liquid food products by evaporation is conducted at low temperature to avoid imparting a boiled flavor to foods such as milk or juices. Even pasteurization tends to be conducted at relatively low temperature. In the United States, pasteurization is carried out at 72° C. (161° F.) for 15 seconds or even at 62° C. (143° F.) for 30 minutes. In Europe, pasteurization is carried out at an even lower temperature of 57° C. (135° F.). The highest temperature utilized for pasteurization (161° F.) is cooler than the hot-well of a power generation unit and cooler than most steam condensates. Therefore, with a good system, pasteurization could be accomplished with waste heat from power generation or other processes requiring higher temperatures.

Many of these fluids are further concentrated after pasteurization. Obviously, one would not want to repasteurize the liquid product again and again during concentration. The liquid product can be concentrated and cooled after pasteurization by conventional flash evaporation rather than passage through cooling coils. However, flash evaporators are not energy efficient.

MacDowell et al (U.S. Pat. No. 2,453,109) is an example of vacuum concentration of fruit juices. Barlow (U.S. Pat. No. 3,024,117) feeds a small particle size fog or mist into a vacuum chamber containing inert gas under conditions such that ice crystals are formed. Harlow et al (U.S. Pat. No. 4,101,681) distills coffee oil in a vacuum chamber is and condenses a desired coffee aroma fraction on a chilled surface.

Toulim, Jr. I (U.S. Pat. No. Re. 23,958) relates to a method and apparatus for vacuum dehydration of fruit and vegetable juices and the like by forming ice crystals. Note particularly that Column 2 commencing with line 19 and continuing through line 44, teaches multiple step freeze dry concentration processes. Toulmin, Jr. II (U.S. Pat. No. 2,916,386) combines the steps of freezing a liquid to be concentrated to produce progressively smaller crystals and then to shock freeze the concentrate in the process of forming a concentrate. Note Column 3 commencing with line 17 where a vacuum step may also be employed to vaporize ice.

Toulmin, Jr. III (U.S. Pat. No. 2,957,773) discloses in Column 2 commencing with line 14, the process whereby heated juice is sprayed into a chamber in the form of a fine mist, said chamber being maintained under sub-atmospheric pressure and temperature to form ice. Barr, Sr. et al (U.S. Pat. No. 3,276,848) and Stout (U.S. Pat. No. 3,892,662) disclose processes which provide for the use of freeze drying-vacuum distillation of sprayed droplets to recover potable water from body wastes. Ganiaris (U.S. Pat. No. 4,069,947) teaches concentration of aqueous solutions with the primary object being centrifuge means for recovering additional solids from ice.

All of these references operate below the triple point of water and/or direct a spray horizontally, outwardly, onto a chilled surface to form frost or ice.

STATEMENT OF THE INVENTION

A fuel-efficient method for concentrating solutions or suspensions has been developed in accordance with the invention. The equipment and its operation are simplified as compared to prior concentration systems. In the method of the invention, uniformly-sized, small droplets fall downwardly into an evacuated tower having cool walls, preferably cooled to just above the triple point of the evaporating liquid, i.e. the point at which vapor, liquid and solid phases coexist and at which the Gibbs free energy of all three phases are equal. The warm solution has a substantial heat content and it does not require many passes to attain desired concentration.

Enthalpy can be utilized as a measure of heat content. Though enthalpy is not absolute and has no universally agreed upon zero as does entropy, it is the change in enthalpy that is important in driving the removal of vapor from the falling droplet. Therefore, setting a zero for enthalpy is arbitrary and is a matter of convention only and may differ from table to table. The steam table from the Chemical Rubber Handbook is utilized herein. The zero point for enthalpy is set at the Triple Point of Water in this table, i.e. just above 32° F. (0° C.).

For example, if small water droplets at body temperature of about 99° F. are dropped into a tower in which the wall is just above the triple point of water, the droplet will cool to the wall temperature by evaporation. During cooling 15.49 lb. mols of liquid cool from 99° F. to about 35° F., each losing 67.0 Btu, while one lb. mol evaporates taking away 1037.6 Btu. Then 15.49 plus 1 lb. mol of water are introduced, of which 1 lb. mol is removed as condensate per pass.

This water at body temperature of about 99° F. contains about 1/16 the enthalpy needed to evaporate all the water present in the fluid. By using a sufficiently small droplet, 1/16 of the water can be removed per pass through the tower. Thus, it does not require many passes to attain sufficient concentration. When the wall is just above the triple point of water, the evaporated water condenses on the walls, flows down the wall and is collected as a liquid. The wall remains free of frost and the process does not require mechanical or vacuum removal of ice crystals as in freeze drying processes. Prill towers also deploy small droplets into a tower. However, an upwardly moving draft of air is utilized to shape the liquid and freeze, cool or dry the droplets into solid prill form.

The method of the invention provides a pronounced increase in efficiency. The reason for this efficiency is that the droplets of liquid can be made very small, and are so deployed that the flow of vapor from them to the cooling surface, i.e. the condenser, is virtually unimpeded. In the vertical, free fall, evaporative tower of the invention, these conditions are present and are compatible with high throughput. Large droplets are to be avoided since boiling can disrupt large droplets and cause them to be diverted sideways during flight, so that some of the juice or other solution will be propelled to the wall and will join the film of condensate on the wall and be lost. Small droplets overcome the tendency to boil. The larger surface tension forces on small droplets and the rapid chilling of the small droplet act in concert to prevent boiling and disruption. Removal of inert gases by means of a vacuum pump prevents forming an air blanket adjacent to the wall condenser which could interfere with the vapor reaching the wall to condense.

These and many other features and attendant advantages of the invention will become apparent as the invention becomes better understood by reference to the following detailed description when considered in conjunction with the drawings.

BRIEF DESCRIPTION OF THE DRAWINGS

FIG. 2 is a schematic view of an alternate embodiment of a droplet forming assembly;

FIG. 3 is a view taken on line 3—3 of FIG. 2;

FIG. 4 is a schematic view of an orifice with smooth, straight sharply angled upstream walls;

FIG. 5 is a schematic view of an orifice incorporating an incised plane;

FIG. 6 is a schematic view of an orifice formed from a thin-walled nozzle;

DETAILED DESCRIPTION OF THE INVENTION

The invention can be utilized to process any liquid in which solvent is to be removed, such as fruit juices, coffee extracts, milk or even metal solutions when molten. The invention only requires formation of small droplets and a suitable temperature differential between the liquid and the inner wall of the tower.

The droplets are formed in a manner to assure predetermined uniform small size. The optimum droplet size is determined by surface tension and the temperature, the object being to avoid explosive or vigorous boiling of the droplet. The droplet size is small and times of flight are shorter for high viscosity liquids, while larger droplets and longer times of flight can be utilized for low viscosity liquids. Typically, the droplet will have a diameter between 0.01 mm to 10 mm, usually from 0.1 mm to 3 mm. The precision of the orifices is between ±1%.

Conventional spray nozzles are not precise enough for droplet formation in accordance with the invention unless the nozzles are machined to have very precise, uniform orifices. The orifices should have a sharp edge for energy efficiency and uniformity of drop formation. It is possible to manufacture high quality and precision orifices of any desired shape having sharp edges by photoetch or laser etch techniques.

Pressure drop also affects droplet formation, causing the column of liquid emanating from the orifices to be pinched as it leaves the orifices. Another factor affecting droplet formation is the resonant frequency of the column. Uniform droplet formation is aided by feeding a small amplitude audio signal to the column. Another manner of inducing column vibration is to utilize non-circular orifices.

Figure 1:
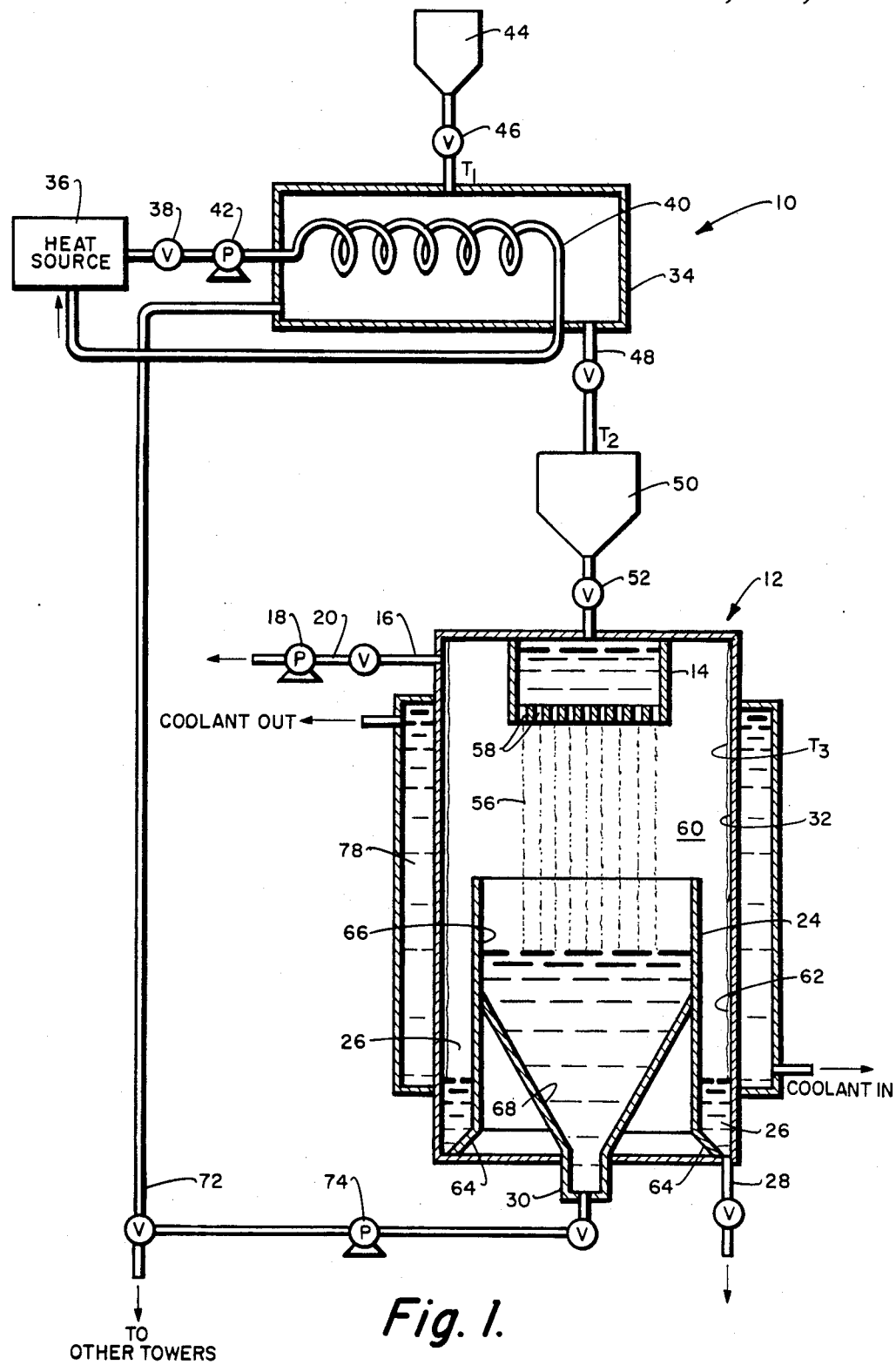
FIG. 1 is a schematic view of a liquid concentration system according to the invention.

Referring now to FIG. 1, the concentration system 10 includes an evaporation tower 12 including a precision droplet forming assembly 14 placed at the top of the tower, a gas outlet 16 connected to an exhaust pump 18 by pipe 20, a condenser in the form of cool inner side walls 32, a central spray collector 24 and an outer annular, condensate collector 26 connected to a drain 28. The spray collector terminates in another drain 30. The length of the tower is determined by mass and heat transfer from droplets and by the size of the droplets. Smaller droplets require shorter towers.

The entering temperature, $T_2$, of the fluid is determined by the necessary temperature difference between the fluid and the wall, $T_3$. The difference is usually at least 10° C., preferably at least 20° C. If the inner tower wall 32 is at room temperature, the liquid temperature, $T_2$, can be as high as the pasteurization temperature.

The pasteurization vessel 34 may be heated by a heat source 36, such as the cooling water from a hydroelectric or nuclear power generating plant or from a solar heated water source. The heated water is fed to coils 40 by opening valve 38 and actuating pump 42. The liquid to be concentrated is fed to the vessel 34 from reservoir 44 when valve 46 is open and flows over the coils 40 and out the outlet 48 into holding tank 50.

Valve 52 is opened and vacuum pump 18 is actuated to evacuate the tower and to remove entrained gases, such as air or $CO_2$ from the liquid after it enters the tower. The liquid enters the droplet assembly 14 and fine, uniform droplets 56 leave the orifices 58 and free fall into the chamber 60. A portion of the solvent evaporates, flows as vapor to the wall 32, condenses and forms a film 62 flowing downwardly into condensate collector 26 and channeled by baffle 64 into the condensate drain 28. The verticle column of free-fall droplets enters the splash guard 66 and flows downwardly into the trap 68 and into drain 30. The condensate can be sent to other towers or recycled by line 72 containing pump 74 to the pasteurization vessel 34 for further passes through the tower 12.

The temperature of wall 32 is preferably at a temperature just above the triple point of the evaporating liquid, i.e., the point at which vapor, liquid and solid co-exist. The wall temperature is no more than 10° C. above the triple point of the vaporizable solvent or liquid, preferably less than 1° C. above the triple point. The three phases are, at the triple point, in equilibrium and their Gibbs free energy is equal. According to the Phase Rule, given one substance in three phases, there is only one temperature-pressure condition at which this occurs. For 0.01° C. and water, the vapor pressure is 4.6 mm Hg. Below the triple point, ice is condensed or sublimates, no liquid water being present. Above it, no ice is present.

The wall 32 can be at any reasonable cooling-water temperature, such as 20° C. This can be provided by ambient air or by flowing cooling water through jacket 78. The juice or other liquid has a higher temperature, such as 57° C. used in European practice which will have little effect on flavor. On each pass through the tower, the liquid will be evaporatively cooled from 57° C. to 20° C. and 6.2% of the water will enter the condensate collector 26 and is recovered through drain 28. At 6% removal per pass, it takes about 11–12 passes to reduce volume by 50% and 17 passes to achieve the same volume reduction at 4% water removal per pass. It is to be noted that most of the entrained gas, such as air dissolved in the juice is removed in the first stage or pass through the tower. Since the juice or other liquid need not be exposed to air again until concentration processing in the tower is complete, the remaining stages require much less vacuum pump capacity.

The basis of the calculated efficiency for the above example is as follows. As the liquid cools from 57° C. (135° F.) to 20° C. (68° F.), each lb.-mol evaporated requires 1016.9 Btu. Each lb.-mol cooled from 135° F. to 68° F. provides 102.95−36.05 or about 66.9 Btu. Hence, 1016.9/66.9=15.2 lb.-mols. This amount plus the one evaporated equals a throughput of 16.2 lb.-mols and an evaporation efficiency of 6.2%. By using the same calculation and reference to the CRC steam tables, a fluid pasteurized at 161° F. can be evaporated in the tower of the invention having a wall temperature of 68° F. with a throughput of about 11.69 lb.-mols per pass with an evaporation efficiency of about 8.57%. Over 50% concentration is achieved after 6 passes.

Liquid jet break-up to form droplets has been studied for over 100 years. A perfectly cylindrical jet is unstable and will tend to break up responding to very small disturbances. For best results the vibration imposed should be in resonance with the natural frequency of the jet which depends on orifice diameter, liquid velocity, surface tension, etc. Though the energy required for the oscillator is very small, narrow frequency tuning is important to avoid a wide variation in the size of the droplets.

The droplet forming assembly 80 displayed in FIGS. 2 and 3 comprises a chamber 82 having an upper liquid receiving section 84 disposed over a perforated orifice plate 86. A transducer 88 is attached to the side of the assembly 80 which in turn is connected to an acoustical driver 91. As shown in FIGS. 2 and 3, the orifices have a sharp edge 90 with the bottom surface 92 of the plate 86 and may have a circular or an oblong cross-section 94. The cross-section preferably has rounded corners, making the ellipse preferable to an oblong. But rounded trifoliate and even more complex shapes can be made to work. The plate may be perforated by a laser or by photo-etching. As water or other liquid fills into the chamber 82, the liquid will transverse the perforations in plate 86 and form a column of liquid emanating from the orifices which is broken into droplets by means of the oblong or elliptical shape of the orifice 94 or by means of the oscillations applied to the plate 86 by the acoustical driver 91 and transducer 88.

It is also possible to autogenously induce oscillations in the jet as it emanates from an orifice. An orifice that is drastically out-of-round will induce oscillations in the jet. This can, but will not necessarily, provide a uniform droplet size. The effect is most clearly seen in FIG. 4 which generates a rectangular velocity profile. The nozzle 100 shown in FIG. 4 has both a sharp edge and a converging, faired profile 104 on the upstream side terminating in a orifice 106 so that the streamlines 108 converge on the orifice 106 creating a nearly rectangular velocity distribution at the orifice 106 and a vena contracta 110 on the downstream side.

Beyond the vena contracta, the stream increases in diameter. It then pinches in again, more drastically than before, swells outwardly again, etc., in an oscillation that is self-amplifying. Ultimately, the final pinch severs the column, which below this point becomes a succession of droplets. Similar behavior results from the nozzle 112 containing an incised plane shown in FIG. 5 in which the stream 114 within tube 116 converges on the sharp-edged orifice 118 in a thin plate 120 and emanates to form a vena contracta 121.

If a circular, well-faired orifice is blocked with an unsymmetrical obstacle, such as a burr or a plate reducing the orifice to a semicircle, a complex set of vibrations is created and the jet is directed off-axis. A symmetrical deviation from the round will avoid off-axis movement of the jet. A uniform pinching in-and-out of the jet beyond the vena contracta that provides a uniform procession of droplets is provided by a comparatively gentle deviation from circular shape. The simplest and gentlest deviation from circular is provided by an ellipse as shown in FIG. 3. This will cause an oscillation with the minimum of harmonics, and hence a minimum of off-size and off-axis droplets. The oblong (understood as a rectangle) orifice in the limit goes to the rectangular slit, which is a classical spray orifice; it produces a wide variety of droplet sizes, spread over a wide angle from the jet axis.

Figure 7:
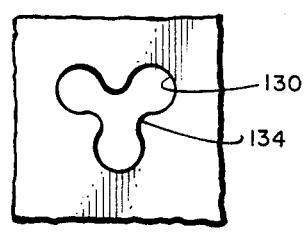
FIG. 7 is a schematic view of an orifice formed of circular lobes.
Figure 8:
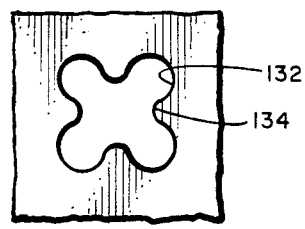
FIG. 8 is a schematic view of an alternate form of a circular lobe orifice.

Sharp corners to the orifice introduce discordant harmonics in the vibration of the jet, producing a broad distribution of droplet sizes, fanned-out over a wide angle. However, rounded orifices, such as the clover orifices 130, 132 with circular segments 134 removed from the periphery as shown in FIGS. 7 and 8, will provide uniform droplet size in a narrow stream.

It may be taken as understood that when the pressure difference across an orifice is too low to form a jet, a drip will occur, in which the drops formed are far larger than the orifice diameter. Again, if the pressure difference is extremely high, almost any shape of orifice will tend to produce a spray. The nozzle 140 shown in FIG. 6 has a thin wall 142, a converging profile 144 and a sharp edge 146. A decrease in pressure, leading to dripping, does not have as serious consequences, since the large drops that are formed are of relatively small diameter: say 5 times that of the orifice, rather than 20 times.

It is proposed to refine metals on the moon from lunar basalt rock by magma electrolysis. Some metals, such as Al, Ti and Si will be virtually impossible to separate by electrolytic means. These metals can be separated by vacuum distillation. However, molten aluminum welds to glass, reduces silica and many other oxides and dissolves significant amounts of iron when in the liquid state. Therefore, building a rectification column for aluminum from moon-won silicates or ferrous alloys is likely to be impractical.

Figure 9:
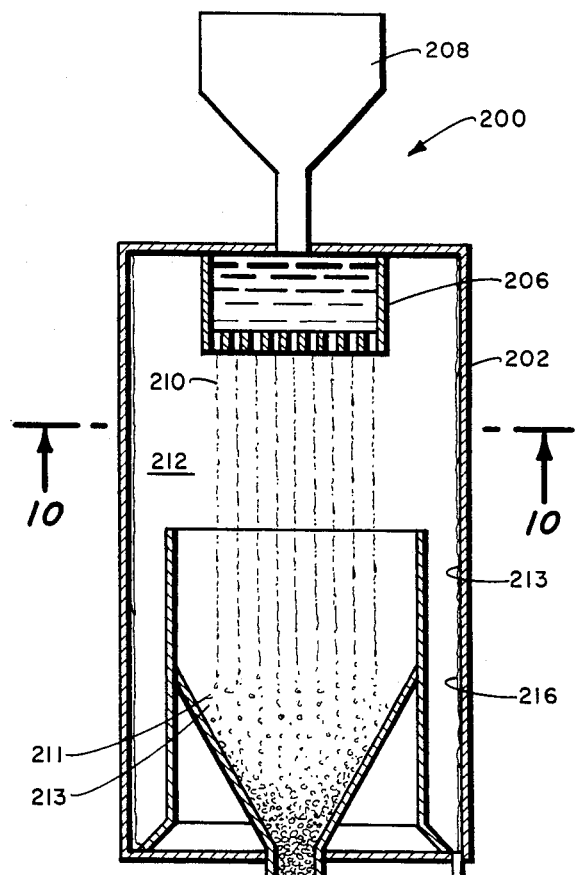
FIG. 9 is a schematic view of a metal processing system.
Figure 10:
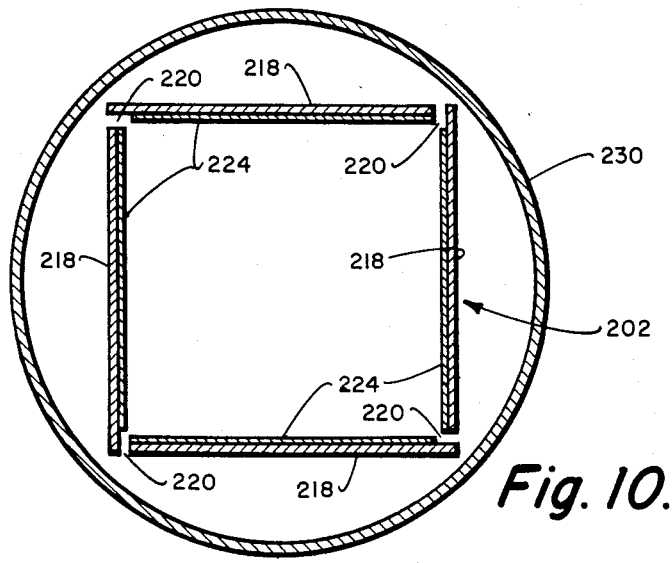
FIG. 10 is a cross-sectional view taken on lines 10—10 of FIG. 9.

The use of the prill-droplet concentration system provides a practical one-pass system. Referring now to FIGS. 9 and 10, the prill-tower metal refining system 200 comprises a polygonal tube of slats 202 open to lunar vacuum and a precision droplet forming assembly 206 connected to the outlet of the molten metal reservoir 208. As molten alloy droplets 210 are discharged downwardly from the assembly 206 into a long chamber 212 under effective lunar vacuum, they cool by evaporation and radiation to form prills or shot 211 which fall into collector 213. Evaporated material, such as Al vapors, will move to the cooler wall 213 of the tower 202 and condense to form a layer 216.

In the present case, the attack of molten aluminum on iron is prevented by freezing the aluminum directly from the vapor phase. Thus, the condensate can be assumed to be solid, and of high reflectivity, minimizing radiative loss of heat. Hence, for a reasonable time of flight and size of droplet, evaporation can be brought to practical maximum.

The polygonal tube can be made of iron slats 218 disposed in a polygonal arrangement with edge gaps 220 for exit of gases. The aluminum vapors condense and deposit on the slats as a layer 224. The product can be subsequently peeled as strips of pure metal. For terrestrial applications, the slat-assembly can be disposed in an outer cylindrical vacuum chamber 230.

The height of the prill tower is minimized by lunar gravity. Prill towers 50–100 ft. high have been used for "shotting" and other purposes on earth. Given that $$d = 16t^2$$

$$t = (d/16)^{\frac{1}{2}}$$

$t = 1.77$ seconds for a 50-ft. terrestrial tower, and only 2.5 sec. for a 100-ft. tower. For a 50-ft. tower on the moon, given the lesser gravity, about one-sixth that on earth, the time of flight is 4.33 sec. Proper choice of droplet size (in turn determined by orifice diameter and head) would assure efficient evaporation, so that metal need not be recirculated to excess. Obviously, there will be trade-offs, depending on feed composition, desired output composition, sensible/latent heat ratio, etc. But there seems no doubt that the desired purity of aluminum can be produced from quite crude input at a reasonable energy cost and with a minimum of imported equipment, which must be brought to the moon from earth at enormous cost.

It is to be realized that only preferred embodiments of the invention have been described, and that numerous substitutions, modifications and alterations are permissible without departing from the spirit and scope of the invention as defined in the following claims.

I claim:

1. A method of concentrating a liquid solution or a liquid dispersion comprising:
   establishing an evacuated region having a pressure less than atmospheric;
   forming a freely - falling stream of small uniform droplets of said solution or said dispersion within said region;
   said droplets having a diameter of 0.01 to 10 mm;
   said region being enclosed within a wall;
   providing a line - of - sight path between said droplets and said wall;
   providing a pressure within said region that produces evaporation of liquid from said droplets to produce a vapor while maintaining the droplets substantially free from boiling during the evaporation;
   cooling said wall to a level sufficient to condense said vapor from said region onto said wall and to provide a driving force for movement of evaporated liquid from said droplets to said wall, and
   collecting said droplets.

2. A method according to claim 1 including the step of further concentrating the concentrated liquid by repassing it through the region as small droplets.

3. A method according to claim 1 in which the temperature of the wall is at least 10° C. cooler than the temperature of the droplets.

4. A method according to claim 3 in which the liquid is a food product and the droplets are at pasteurization temperature.

5. A method according to claim 4 in which the temperature of the wall is no more than 1° C. above the triple point of water.

6. A method according to claim 1 in which the droplets are formed by applying acoustical oscillations to the liquid.

7. A method according to claim 1 wherein said wall is cooled to a temperature corresponding to the triple point of the vapor so as to maximize the driving force for movement of evaporated liquid from said droplets to said wall.

8. A method according to claim 7 in which the vapor is water.

9. A method according to claim 1 in which the size of the droplets is from 0.1 to 3 mm.

10. A method according to claim 1 in which the liquid is a food product.

11. A method according to claim 10 in which the food product is fruit juice, a coffee extract or milk.

12. A method according to claim 1 in which the liquid is a molten metal.

13. A method according to claim 1 in which the droplets are formed by passing the liquid through an orifice having a sharp edge and a circular cross section.

14. A method according to claim 13 in which the orifices have a precision between ±1 percent.

15. A method according to claim 1 in which the droplets are formed by passing the liquid through an orifice having a sharp edge and an oblong cross section.

16. A method according to claim 15 in which the orifices have a precision between ±1 percent.

17. A method according to claim 1 in which the droplets are formed by passing the liquid through an orifice having a sharp edge and an elliptical cross section.

18. A method according to claim 17 in which the orifices have a precision between ±1 percent.

19. A method according to claim 1 in which the droplets are formed by passing the liquid through an orifice having a sharp edge and a circular - lobal cross section.

20. A method according to claim 19 in which the orifice have a precision between ±1 percent.

* * * * *